United States Patent
Pullen et al.

(10) Patent No.: US 7,124,276 B2
(45) Date of Patent: Oct. 17, 2006

(54) OPTIMIZING CACHE EFFICIENCY WITHIN APPLICATION SOFTWARE

(75) Inventors: David Michael Pullen, Suwanee, GA (US); Michael Antony Sieweke, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 206 days.

(21) Appl. No.: 10/412,338

(22) Filed: Apr. 14, 2003

(65) Prior Publication Data

US 2004/0205307 A1    Oct. 14, 2004

(51) Int. Cl.
G06F 12/02    (2006.01)
(52) U.S. Cl. .................. 711/210; 711/165; 717/151; 717/153; 717/159
(58) Field of Classification Search ............. 711/128, 711/158, 133; 718/104; 717/153, 159
See application file for complete search history.

(56) References Cited

U.S. PATENT DOCUMENTS

| | | | | |
|---|---|---|---|---|
| 5,212,794 A | * | 5/1993 | Pettis et al. ............... | 717/153 |
| 5,848,275 A | * | 12/1998 | Maydan et al. ............ | 717/159 |
| 5,940,618 A | * | 8/1999 | Blandy et al. ............. | 717/128 |
| 6,002,875 A | * | 12/1999 | Stolberg .................... | 717/153 |
| 6,129,458 A | * | 10/2000 | Waters et al. .............. | 711/133 |
| 6,625,806 B1 | * | 9/2003 | Ono et al. ................. | 717/136 |
| 6,883,067 B1 | * | 4/2005 | Southwell et al. ......... | 711/118 |
| 2004/0215880 A1 | * | 10/2004 | Chilimbi et al. ........... | 711/118 |

OTHER PUBLICATIONS

Brad Calder, Chandra Krintz, Simmi John, and Todd Austin, "Cache-Conscious Data Placement", © 1998 ACM. 8th Int'l Conference on Architectural Support for Programming languages and Operating Systems, Oct. 1998.*

* cited by examiner

*Primary Examiner*—Donald Sparks
*Assistant Examiner*—Jesse Diller
(74) *Attorney, Agent, or Firm*—Sterne Kessler Goldstein & Fox PLLC

(57) ABSTRACT

The present invention finds the optimum organization of compiled code within an application to ensure maximal cache efficiency. A configuration file specifies predefined cache, optimization, and application parameters. The cache parameters include a cache size, cache line size, set associativity, address-to-cache-line mapping algorithm, and set replacement algorithm. The optimization parameters specify the minimum acceptable efficiency level. The application parameters include a list of object modules and functions within those modules. All possible orderings of the modules are stepped through to determine where the specified functions fall within the cache given the location of the function within the module. The function locations in each permutation of the orderings are analyzed to find a solution that matches or beats the optimization parameters. In an embodiment, a front-end analysis program ("tool") and a back-end processing stage, usually related to a linker, are provided. The tool reads the configuration file, analyzes the application, and recommends the optimal solution. In an embodiment, a development tool can be used instead of the front-end analysis tool. In another embodiment, a linker or a post-processing stage can be used to place the important functions adjacent to each other in cache.

35 Claims, 13 Drawing Sheets

Example of an 8k cache

| Cache Line # | Set 0 | Set 1 |
|---|---|---|
| 0 | Function 1 | Function 2 |
| 1 | Function 1 | Function 2 |
| 2 | Function 1 | Function 2 |
| 3 | Function 1 | Function 2 |
| 4 | | |
| 5 | | |
| 6 | | |
| 7 | | |

Inefficient use of cache lines

| Cache Line # | Set 0 | Set 1 |
|---|---|---|
| 0 | Function 1 | |
| 1 | Function 1 | |
| 2 | Function 1 | |
| 3 | Function 1 | |
| 4 | Function 2 | |
| 5 | Function 2 | |
| 6 | Function 2 | |
| 7 | Function 2 | |

Best use of cache lines; the tool calculates and recommends this kind of solution

FIG. 4

| Cache Line # | Set 0 | Set 1 |
|---|---|---|
| 0 | Function 1 | Function 2 |
| 1 | Function 1 | Function 2 |
| 2 | Function 3 | Function 2 |
| 3 | Function 3 | Function 2 |
| 4 | Function 3 | |
| 5 | Function 3 | |
| 6 | | |
| 7 | | |

Function 3 is fetched, replacing the least recently used set

FIG. 5

| Cache Line # | Set 0 | Set 1 |
|---|---|---|
| 0 | Function 1 | Function 2 |
| 1 | Function 1 | Function 2 |
| 2 | Function 3 | Function 1 |
| 3 | Function 3 | Function 1 |
| 4 | Function 3 | |
| 5 | Function 3 | |
| 6 | | |
| 7 | | |

Normal processing resumes, fetching Function 1 into the new least recently used set, flushing part of Function 2

FIG. 6

| Cache Line # | Set 0 | Set 1 |
|---|---|---|
| 0 | Function 1 | Function 2 |
| 1 | Function 1 | Function 2 |
| 2 | Function 2 | Function 1 |
| 3 | Function 2 | Function 1 |
| 4 | Function 3 | |
| 5 | Function 3 | |
| 6 | | |
| 7 | | |

Function 2 executes as part of normal processing, and must be fetched, flushing part of Function 3

| Cache Line # | Set 0 | Set 1 |
|---|---|---|
| 0 | Function 1 | |
| 1 | Function 1 | |
| 2 | Function 1 | Function 3 |
| 3 | Function 1 | Function 3 |
| 4 | Function 2 | Function 3 |
| 5 | Function 2 | Function 3 |
| 6 | Function 2 | |
| 7 | Function 2 | |

Function 3 is fetched into the least recently used set

FIG. 8

OPTIMIZING CACHE EFFICIENCY WITHIN APPLICATION SOFTWARE

BACKGROUND OF THE INVENTION

1. Field of the Invention

The present invention relates generally to memory systems, and more particularly to optimizing memory utilization for a requesting processor.

2. Related Art

Processors are becoming exceptionally fast, often operating at speeds of hundreds, if not thousands, of millions of cycles per second. Memory speed has also increased, but is still slow relative to processor speed. In order to allow processors to use all of their power and speed, a high-speed memory known as cache is used as the interface between the fast processor and the slower main memory. When cache memory is built into the processor itself, it usually runs at the same speed as the processor. External caches typically run slower than the processor, but faster than the speed of main memory. Without cache, the processor must read and write directly to the main system memory, which limits the processor's maximum speed to that of the memory.

Cache memory is most often divided into an Instruction Cache (ICache) and Data Cache (DCache). Because the processor tends to access instructions (which comprise the program that is being executed) in a different manner than it accesses the data that is used by the program, keeping the ICache separate from the DCache improves system efficiency.

Cache memory is generally much larger than standard memories, such as DRAM, due to the requirements for more speed and extra tag information. It is difficult to meet timing, routing and power requirements of the processor when very large caches are used. The size of the chip usually increases when a larger cache is integrated, which increases the cost of the chip. System and processor designers must strike a balance between performance related to cache size and the total cost of the processor or system. As a result, the cache is usually kept to a fairly small size from 4-to-256 kilobytes, especially for the cost-sensitive embedded systems market. As the cache size shrinks, issues like cache utilization and efficiency become very important. In some cases, additional hardware can be added to address the problem, but in most cases, hardware size must be limited. Therefore, there is a need to find more efficient manners to use the available cache.

While the size and cost of the processors are being driven down, the size and complexity of the applications running on those processors are growing. The demands for multimedia and broadband communications applications are stressing system components to their maximum, fueling the demand for more power and speed. Except for the most trivial applications and the most high-end processors, the size of the application almost always exceed the capacity of the cache memory.

It is not uncommon to see embedded systems applications that exceed two megabytes. PC-based applications can be tens of megabytes or larger. However, a very small percentage of the code usually executes most frequently. Quite often this code can fit within the cache. Even so, it is possible for this small portion of code to make very inefficient use of the cache. The inefficiency can be so bad that performance is almost as low as if there had been no cache at all. The processor is only getting the benefit of the burst reads and writes to main system memory.

As the processor executes an application program, it fetches instructions from the ICache. The ICache is responsible for ensuring that the instructions being fetched are present in the cache and for reading instructions from the main memory, or a second level cache, when they are not present. The same is true for data in the DCache. The program causes the processor to read or write data through the DCache, which is responsible for fetching or flushing information from the main memory as needed. The cache may also pre-fetch from the main memory using various prediction algorithms in an attempt to minimize the amount of time that the processor has to wait for instructions or data to be fetched into the cache.

When the processor tries to read or write an address, the cache must map the address to a cache line and determine whether or not the cache line contains the requested information. There are a number of algorithms for this mapping. One common algorithm is to use some number of low-order bits from the address to form an index for the cache line. For example, if the cache line size is sixteen bytes and there are 256 cache lines, then the lower four bits of the address could be used as the byte address within the cache line and the next eight bits could be used as the cache line index. Additionally, the set associativity comes into play. Given a mapping to a cache line, the cache must then check to see which set the address has been mapped to. For a two-way set associative cache with 256 lines, there are effectively 256 pairs of cache lines.

The cache uses a single algorithm to map the requested address to a cache line, regardless of the number of sets, but the address could be placed in any of the sets within that cache line. The cache usually contains extra information (tags) that determines which set within the cache line contains the requested address. The more sets there are in the cache, the more addresses it can map to a cache line without causing existing data to be flushed. However, given a constant total cache size, adding more sets will decrease the number of cache lines. In other words, an 8 k cache with 4 sets will have half as many cache lines as an 8 k cache with 2 sets.

If the requested information is present in one of the sets of the computed cache line, the cache provides the data to the processor, and everything proceeds at full speed. If the information is not present, the cache must block the processor as it fills one or more cache lines in order to satisfy the request. Filling the cache lines causes instructions or data already present to be flushed and/or discarded.

As with most software and hardware systems, the underlying architecture of an application is very important. Some programmers rely on the compiler and linker to do a reasonable job organizing the application code in cache, and live with the results. In very special circumstances (with very small programs), the programmers may hand-code the application for efficiency in memory, CPU, and cache utilization. The programmers may choose to rewrite and re-architect the software so that the important code is all in one module and is guaranteed to be adjacent and minimally overlapping in cache. Of course, this is not feasible for most systems and is extremely difficult and tedious in even the most limited of cases.

In other words, rewriting the code is an option for placing the performance critical functions in a monolithic file, ensuring cache efficient code. However, a code rewrite would destroy the architecture, modularity, and flexibility to use the software for other application domains, and increase the difficulty of maintenance. A code rewrite would also cause unwanted delays in the product delivery schedule, as well as increase the risk of introducing bugs. Additionally, this approach cannot accommodate code that is not immediately part of a software application, such as third-party libraries and operating system components. Obviously, this approach is extremely undesirable.

Therefore, what is needed is a way to ensure cache efficiency that overcomes the aforementioned problems.

SUMMARY OF THE INVENTION

The present invention enables compiled code within an application to be organized to ensure maximal cache efficiency. The present invention can be implemented primarily with an instruction cache (ICache), but can also be used to optimize a data cache (Dcache).

In an embodiment, the present invention includes a front-end analysis program ("tool") and a back-end processing stage, usually related to a linker. The tool takes input specified by a user, and analyzes an application via the linker produced map file. The specified input can be read from a configuration file, and comprises cache parameters, optimization parameters, and application parameters. Following the analysis phase, the tool recommends a number of solutions representing an organization of the code that matches the specified optimization parameters. A solution is then selected and fed back to the linker so that the final application has the best possible cache efficiency.

The cache parameters are specified to determine the size and behavior of the cache. In an embodiment, the cache parameters include a total size in bytes, cache line size, set associativity, address-to-cache-line mapping algorithm, and set replacement algorithm. The cache parameters are specified according to the processor and/or cache for which the application is being optimized. Each processor may have a different cache, which requires a separate analysis in order to find the optimal solution. If creating and distributing multiple versions of the application is not feasible, a median or minimum configuration for the cache parameters can be selected to ensure that the application is reasonably optimized for as many systems as possible.

The optimization parameters are specified according to the minimum acceptable level of efficiency. In some cases, there may not be a solution satisfying the required optimization parameters, in which case the user is granted the option of relaxing the parameters or changing the code so that the desired solution is possible. As the optimization parameters are relaxed, the tool can find solutions more easily and more quickly, on the average.

The application parameters are specified based on the characteristics of the application. The code must be analyzed to determine which functions are performance sensitive and need to be optimized for cache utilization. Such important functions can be identified by using code inspection, logic analysis, profile or debug tools, or the like. Therefore, the tool requires a list of the functions of interest (and the object modules that contain them) so it knows what to look for in the application's map file. As such, it is not necessary for the tool to know the structure or function of the code. Moreover, the tool can work with any kind of application and with numerous programming languages.

Accordingly in an embodiment, the user specifies a list of object modules and functions within those modules. The tool steps through all possible orderings of the object modules, and determines where the specified functions would fall within the cache given the location of the function within the module. The tool continues reordering and checking function locations until it finds a solution that matches or beats the specified optimization parameters.

It should be understood that the present invention is not limited to the use of a front-end analysis tool to find the optimal code placement. In an embodiment using development tools to support individual function placement, a development tool can be used instead of the front-end analysis tool.

In another embodiment, a linker or some type of post-processing stage can be used to place the important functions such that they are adjacent to each other in cache. Up-front analysis, nonetheless, must be performed to determine which functions are important.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

FIG. 4 illustrates an example of a cache memory exhibiting a better use of cache lines, according to an embodiment of the present invention.

FIG. 5 illustrates replacing a LRU set into the cache memory of FIG. 3.

FIG. 6 illustrates fetching a function into a new LRU set of the cache memory of FIG. 3.

FIG. 7 illustrates an example of a cache memory fetching a function into the cache memory of FIG. 3.

FIG. 8 illustrates fetching a function into a LRU set of the cache memory of FIG. 4.

DETAILED DESCRIPTION OF THE INVENTION

Figure 1:
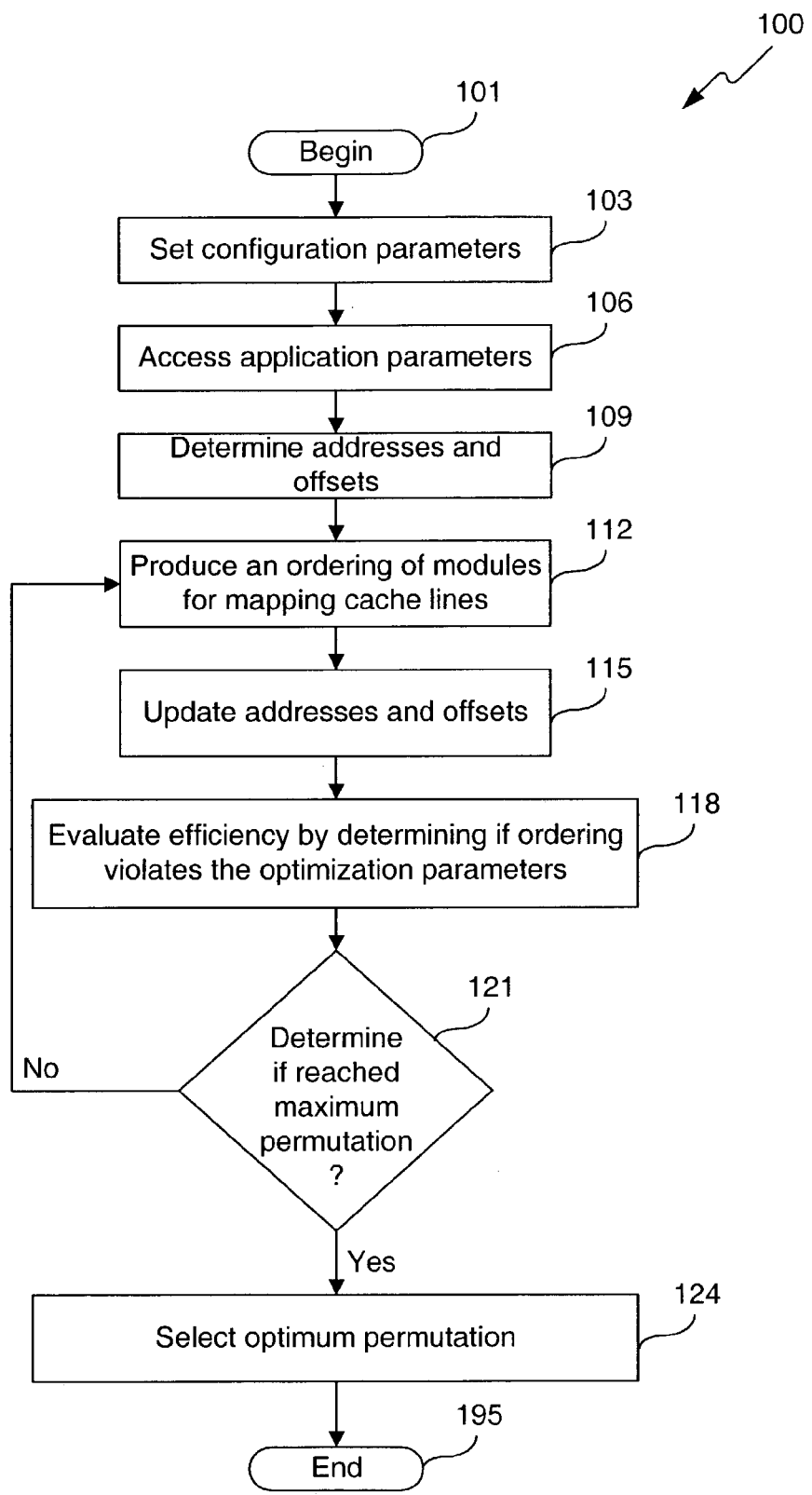
FIG. 1 illustrates an operational flow for optimizing the organization of a cache memory according to an embodiment of the present invention.

The present invention is directed towards organizing the contents of a cache memory to ensure maximal operational efficiency. Referring to FIG. 1, flowchart 100 represents the general operational flow of an embodiment of the present invention. More specifically, flowchart 100 shows an example of a control flow for optimizing information organized within a cache. The present invention is described herein with reference to organizing compiled code within an instruction cache (ICache) for an application program. However, the present invention can also be implemented to analyze and organize the use of a data cache (Dcache), or other types of memory.

Referring to FIG. 1, the control flow of flowchart 100 begins at step 101 and passes immediately to step 103. At step 103, a number of configuration parameters are received as input. The configuration parameters can be established by a system operator or user, and saved to a configuration file. Subsequently, the configuration file is accessed at startup to extract the configuration parameters. In an embodiment, three types of configuration parameters are specified. The three types include cache parameters, optimization parameters, and application parameters.

Cache parameters are generated from the characteristics of the cache being used. The cache parameters include the cache size, the cache set associativity, and the cache line size. Cache size specifies the size of a particular ICache in kilobytes. For example, a value of eight means eight kilobytes, or more specifically, 8192 bytes.

Cache set associativity specifies the number of sets in a particular ICache. The cache set associativity must be greater than or equal to one, and generally will be a power of two (e.g., 2, 4, 8, etc).

Cache line size specifies the number of bytes in each cache line of a particular ICache. The cache line size is also generally a power of two.

The cache parameters are specified according to the processor for which the application is being optimized. In an embodiment using multiple processors where the cache for each processor is different, each cache for a processor would require a separate analysis in order to optimize its organization. If an application is being optimized for multiple processors where the cache for each processor is different, multiple versions of the application code can be created and distributed to each processor, with each version being optimized for each processor and associated cache.

If creating and distributing different multiple versions of the application code is not feasible, a median or minimal configuration for the cache parameters can be selected to ensure the application is reasonably optimized for as many systems (i.e., caches) as possible.

The number of cache lines for an ICache is calculated by the following equation:

Number_Of_Cache_Lines=
(ICache_Size÷ICache_Set_Associativity÷ICache_Line_Size).

Thus, for an eight kilobyte cache with a two-way set associativity and a cache line size of sixteen bytes per line, the cache would include 256 cache lines [i.e., (8192 bytes÷2 set associativities=4096 bytes per set associativity); and (4096 bytes per set associativity÷16 bytes per cache line=256 cache lines per set associativity].

Figure 2:
FIG. 2 illustrates a cache memory according to an embodiment of the present invention.

FIG. 2 illustrates an example of a cache 200 according to an embodiment of the present invention. The cache size for cache 200 is eight kilobytes. For each cache line in cache 200, there are multiple mappings to addresses in the main memory (not shown). The lower bits of the address (depicted as Y) are used as the byte offset into a cache line. The next bits form the index for each cache line number. The upper bits are not relevant to the cache line mapping. Any address with bits 4–11 equal to 0 will map to cache line 0. With 32 bit addresses, this yields $2^{20}$ or 1,048,576 addresses that will map to each cache line. Because there are many mappings to each cache line, the cache must keep extra information (e.g., tags) that tells which address has been loaded into each set of each cache line in order to determine whether or not the cache line contains the desired information. As discussed above, although cache 200 depicts an instruction cache, the concepts and principals of the present invention also apply to DCache optimization. It should also be understood that cache 200, as described above, is an example for mapping addresses to a cache line index. Other mappings can be used and incorporated into the present invention, as would be apparent to one skilled in the relevant art(s).

Referring back to step 103 of FIG. 1, a second type of configuration parameters includes optimization parameters. The optimization parameters are specified according to a minimum acceptable level of efficiency. In some cases, it may not be possible to derive a solution satisfying the required optimization parameters, in which case the user will need to either relax the parameters or change the code so that the desired solution is possible. As the optimization parameters are relaxed, a solution can be determined more easily and more quickly, on average.

In an embodiment, the optimization parameters include maximum-hits-per-cache-line, maximum-cache-lines-with-maximum-hits, and a permutation threshold. The maximum-hits-per-cache-line parameter specifies the maximum number of addresses that can match or hit a cache line. The maximum-cache-lines-with-maximum-hits parameter specifies the quantity of cache lines that are allowed to reach the maximum-hits-per-cache-line value if the maximum number of hits on a cache line is greater than the cache set associativity, described above as a cache parameter.

Finally, the permutation threshold specifies when to stop looking for an optimum solution. The user may want to do an exhaustive search for all solutions that match the optimization parameters. However, this can take a very long time. Alternatively, a search for an optimum solution can end after finding the first solution that matches the first two optimization parameters, mentioned above. Conversely, the searching can end after finding the best solution possible for the specified application and cache parameters.

The maximum-hits-per-cache-line parameter should be less than or equal to ICache set associativity, so that once the instructions or addresses have been loaded into the cache, they will not need to be fetched into the cache line again. If the number of hits on a cache line exceeds the ICache set associativity parameter, the cache will need to flush out one of the sets and fetch the addresses over and over as they are requested. However, if the code is sufficiently large, it will not be able to fit entirely within the cache, and this parameter will need to be relaxed.

If the number of hits per cache line is allowed to exceed the set associativity, the associated damage can be limited by keeping the maximum-cache-lines-with-maximum-hits parameter at a small value. This parameter ensures that the fewest possible cache lines have excessive hits. For example, if the cache is two-way set associative and the maximum-hits-per-cache-line parameter is set to the value three, then setting the maximum-cache-lines-with-maximum-hits parameter to the value eight ensures that no more than eight cache lines will be allowed to have three hits. The remaining cache lines will have two or less hits. With larger code, the maximum-cache-lines-with-maximum-hits value needs to be larger in order to find a solution.

The third type of configuration parameters includes application parameters, which are specified according to the characteristics of the application. The code is analyzed to determine which functions are performance sensitive and need to be optimized for cache utilization.

In order to make use of the most common features for the broadest possible selection of development tools, the present invention enables the code placement and ordering to be implemented at the level of object modules. As such, the user can specify, as an application parameter, a list of object modules and functions within those modules. In the real world, most linkers give the user little or no control over the placement of code at a higher level of granularity (i.e., specify the location and/or offset of each function within the application).

One challenge in creating the application parameters is analyzing the code to determine which functions are important for cache optimization and efficiency. This can be done via any number of tools and processes, including, but not limited to, code inspection, logic analyzer captures of instruction fetches, profile or debug tools to analyze the code as it executes, and the like. For example, a logic analyzer can be used to capture SDRAM accesses, which can be correlated to the specific functions and modules of the application.

At step 106, the application parameters are extracted from, for example, the configuration file, to access the functions of interest (i.e., functions being performance sensitive).

At step 109, the list of functions and modules are used to search a map file and determine the starting and ending addresses of the functions. The location and size of the modules are also determined. The addresses are converted to offsets because it is necessary to know only where the functions lie within the modules. Calculating offsets are described in greater detail below with reference to FIG. 10.

At step 112, an ordering of the object modules is produced to determine where the specified functions would fall within the cache given the location of the function within the module. As discussed in greater detailed below (at step 121), multiple orderings can be produced depending on the permutations threshold. In an embodiment, the order of the object files in the configuration file (at step 103) becomes the seed value for the first permutation, which represents the first ordering. At each permutation, all previous permutations are tracked or recorded so that previous orderings are not repeated.

At step 115, all of the modules are iterated to update the offsets from each other. Similarly, the functions are iterated to set the start and end addresses based on where the modules are placed.

At step 118, the efficiency of the ordering is evaluated by iterating over each cache line and determining which functions hit it. If the number of hits on a cache line exceeds the maximum-hits-per-cache-line parameter, the ordering is rejected. Alternatively, if no cache lines exceed this parameter, but there are too many cache lines meeting the maximum-cache-lines-with-maximum-hits value, the ordering is also rejected. If the ordering violates none of the optimization parameters, the ordering is selected as a possible solution.

At step 121, it is determined whether another permutation should be evaluated. According to mathematical counting and permutations, for any set of N items, there are N! (N factorial=N*N−1*N−2* . . . *3*2*1) permutations of those items that produce unique ordered sequences. This means that for ten object modules, there are just over 3.6 million permutations. For fifteen object modules, there are around 1.3 trillion permutations. For twenty object modules, there are over 2.4 million trillion permutations. As the complexity of the software increases, the number of modules tends to increase, which means that any non-trivial application is likely to have a large number of permutations to evaluate. This can take a long time, even on a very fast system. However, the permutations threshold can be set to reduce the number of permutations that must be evaluated and to speed up the processing of each permutation. Otherwise, the present invention keeps iterating until it reaches the last permutation, or is stopped by the user.

At step 124, the best solution is selected from the set of permutations that matches or beats the specified optimization parameters. Therefore, the present invention continues reordering and checking function locations until it finds an optimum solution, or is stopped by the user. All optimizations are performed relative to an arbitrary base address which is based on the offset values. The actual base address, and thus the actual addresses of the functions and modules, does not matter. After the optimum solution is selected, the control flow ends as indicated at step 195.

As described above, the efficiency of each possible solution is evaluated by iterating over all cache lines. For each cache line, iterations must be performed on all functions to check the number of functions that hit the cache line. An alternative process for efficiency evaluation is described with reference to flowchart 1300 in FIG. 13. Thus, flowchart 1300 represents a general operational flow of another embodiment for optimizing information organized within a cache.

Figure 13:
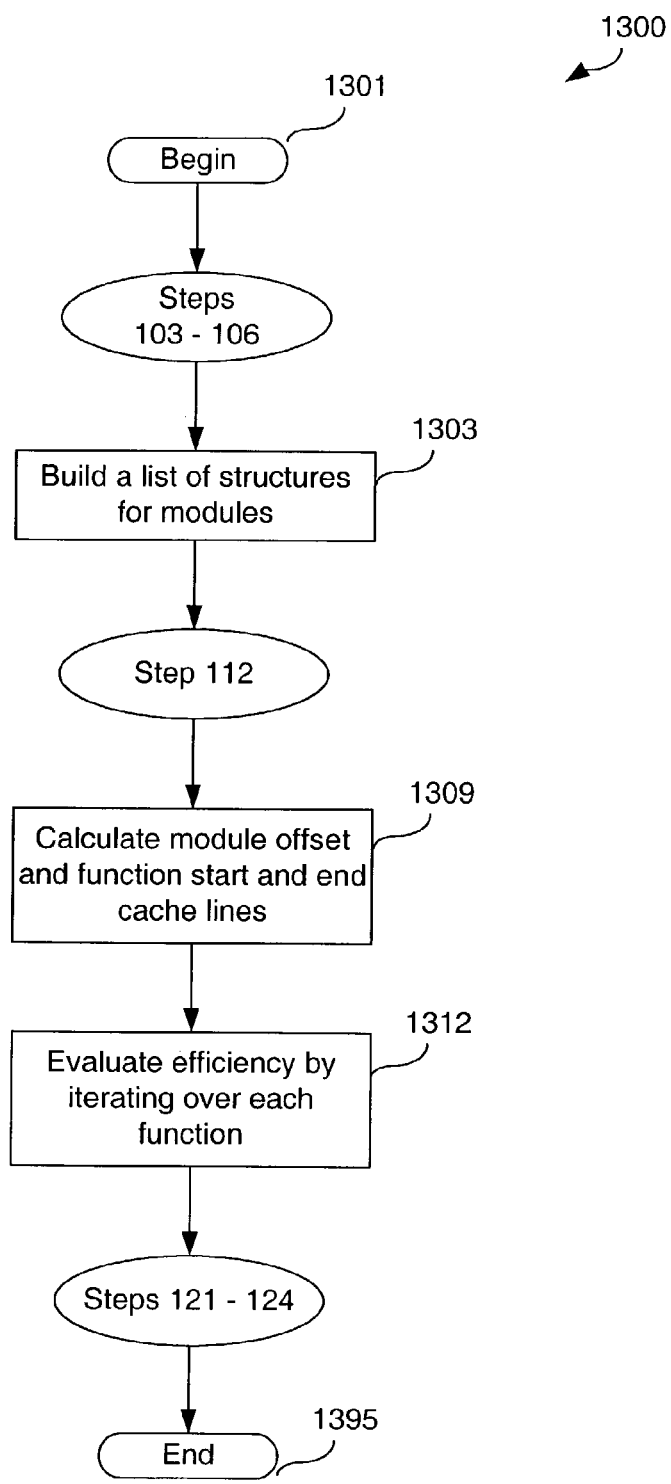
FIG. 13 illustrates an operational flow for optimizing the organization of a cache memory according to another embodiment of the present invention.

Referring to FIG. 13, the control flow of flowchart 1300 begins at step 1301 and passes immediately to steps 103–106 to establish and access a configuration file, including the cache parameters, optimization parameters, application parameters, and the like, as described above.

At step 1303, a list of structures, or the like, is built from the application parameters in the configuration file and the information found in a map file. For each object module, a list of structures is built to include information about each function of interest in the object module. Each structure contains the offset of a function within the module, the size of the function, strings for the function, module names (e.g., for output), and placeholders for the starting and ending cache lines of the function.

In an embodiment, adjacent functions within an object module are combined for increased speed or efficiency. While building the list of structures, the module can be searched to identify the functions that are adjacent to each other. The adjacent functions are combined into a single, larger super-function, which has the benefit of reducing the number of functions to be evaluated while producing results that are identical to what would be produced if the functions are handled separately.

After step 1303, the control flow passes to step 112 to select an ordering of object modules, as described above.

Then, at step 1309, iterations are performed over each object module in the selected ordering to calculate the module offset and the functions' start and end cache lines. During the iterations, an offset is calculated for the start of the object module. The offset for the first module set to "0," and the offsets of each following module is equal to the offset of the preceding module plus the size of the preceding module.

As the offset of each module is calculated, iterations are performed on the information structures for each function (or merged super-function) in the module, which includes calculating the start and end cache lines for the function. The function's start address is calculated using the module offset plus the function offset within the module. The function's end address is calculated as the start address of the function plus the size of the function. The start and end addresses are then used to calculate the start and end cache lines using the address-to-cache-line mapping algorithm, as described above.

At step 1312, the efficiency of the selected ordering is evaluated by iterating over the functions and tracking the number of hits. For each cache line, a counter is used to track the number of hits. In an embodiment, the counters are stored in an array, or the like, and indexed by the cache line number.

For each permutation, the counters are cleared by setting them to zero. Then, for each function, the start and end cache lines are used to iterate over and increment the counters for each of the cache lines occupied by the function. If, during this iteration, the counters are found to exceed the optimization parameters, the iteration is stopped, and the permutation is rejected.

If none of the optimization parameters are violated after iterating over all of the functions, the permutation is selected. The permutation can be written to a file or output to a user.

Afterwards, the control flow passes to steps 121–124 to evaluate other permutations and select the optimum solution, as described above. After the optimum solution is selected, the control flow ends as indicated at step 1395. It should be understood that the expressions "structure," "list," "counter," and "array" are used herein for illustrative purposes. Other techniques or methodologies for counting and/or tracking information can be implemented and are considered to be within the scope of the present invention.

As can been seen, the control flow of flowchart 100 iterates over all functions once per cache line. However, the control flow of flowchart 1300 evaluates only the cache lines occupied by each function, and iterates over the functions only once. As such, the permutations can be accepted or rejected more quickly. Also, by pre-calculating and storing the start and end cache lines, the amount of work and processing time can be reduced during the efficiency evaluation process.

The control flow of flowchart 1300 is also advantageous if the user seeks the best solution instead of stopping after the first solution. As such, the user is able to update the optimization parameters so that the solution will converge more quickly, since the optimization parameters are tightened with each acceptable solution that is found. This can be illustrated in the following example.

Assume at step 103, the optimization parameters are initially set for four hits-per-cache-line, with a maximum of 128 cache lines containing four hits. Also, assume that the best possible solution is two hits per cache line, with 192 cache lines containing two hits.

If it is discovered that after, for example, 250 permutations, all permutations exceeded five hits-per-cache-line, except for one permutation, which has three hits on twenty-five cache lines. The permutations exceeding five hits would be rejected, and the one having three hits would be selected as being a possible solution. At this point, the optimization parameters can be automatically updated to match the current solution, so that the next permutation that is considered acceptable must beat this. As described in greater detail below, a front-end analysis program is used in an embodiment to perform the automatic updating.

Assume that after 700 additional permutations, a solution is selected that has two hits on 220 lines. In this example, permutations are quickly skipped that would have been acceptable for the initial optimization parameters specifying four hits-per-cache-line, with a maximum of 128 cache lines containing four hits, but are no longer acceptable for the revised optimization parameters specifying three hits-per-cache-line, with a maximum of 25 cache lines containing three hits. Furthermore, the optimization parameters can now be automatically updated to match the solution having the optimization parameters that specify two hits-per-cache-line, with a maximum of 220 cache lines containing two hits, and continue the search for the optimum solution.

The present invention works with the existing source code and software architecture. The present invention also works with components that are not part of the source code (such as operating components and third-party libraries). Moreover, the present invention is resilient to irrelevant code changes within the application, and is flexible to accommodate different applications and programming languages, as well as different processor and/or cache architectures.

In an embodiment, the present invention provides a front-end analysis program ("tool") and a back-end processing stage, usually related to the linker. The purpose of the tool is to take input specified by the user (e.g., cache parameters, optimization parameters, and application parameters), and analyze the application via the linker produced map file. From the analysis, the tool recommends a number of solutions that represent the organization of the code that matches or beats the specified optimization parameters. In an embodiment, the tool calculates and recommends the best possible solution at startup. The solution is then selected and fed back to the linker so that the final application has the best possible cache efficiency. Knowledge of the structure or function of the code is not required by the tool to perform the optimization. Therefore, the present invention can be implemented with any kind of application or numerous programming languages.

Given the cache parameters and the application information read from the map file, the best possible solution is one in which the code completely fills the smallest number of sets across all cache lines. If the application is compiled and linked such that the most commonly used instructions or data all map to a small set of cache lines, the processor will be stalled for significant periods of time as the cache struggles to keep filling the same cache lines. If the application is compiled and linked such that the common instructions evenly fill all of the cache lines, cache efficiency is as high as it can be, and the application appears to run much faster because the processor is not blocked as much.

Figure 3:
FIG. 3 illustrates an example of a cache memory exhibiting an inefficient use of cache lines.

FIG. 3 and FIG. 4 provide an exemplary implementation of the present invention by showing an inefficient use of cache and the best use of cache. In FIG. 3 and FIG. 4, it is assumed that the cache has only eight lines and that the application consists of three small functions, two of which are considered important and are optimized in cache.

Even though both of these arrangements within cache are identically efficient while running the most important code (i.e., Functions 1 and 2), FIG. 4 is more efficient with respect to the entire system. FIG. 4 is more efficient because most non-trivial applications will occasionally need to do some amount of other processing. In general, this processing will call functions that have not been optimized for cache utilization and will almost certainly hit the same cache lines that contain some of the "important" code. When this occurs, the cache must block the processor as it fills one or more cache lines in order to satisfy the request for the functions that have not been optimized. Filling the cache lines causes some of the "important" code already present to be flushed and/or discarded.

The cache uses one of several possible algorithms to determine which set of the cache line should be replaced. The most common algorithms are Least Recently Used (LRU) and Random. For LRU, the cache must inspect tag information for all sets in the cache line and determine which one was accessed least recently. This is the set that will be replaced. For Random, the cache will choose a set at random and replace it.

In accordance with the present invention, the best possible solution is the solution that spreads the functions out among as few sets as possible. This helps to ensure that less of the important code is flushed out of the cache when the other code runs. As a result, full efficiency can be reached again more quickly after returning to the important code.

This can be illustrated with reference to FIG. 5 where Function 3 is called periodically. It is assumed that an address-to-cache line mapping algorithm, or the like, is used to map an address for Function 3 to the cache lines. As discussed above, some number of low-order bits from the address can be used as an index for a byte address within a cache line. A number of low-order bits from the address can also be used as a cache line index. Accordingly, it is assumed that the mapping algorithm implements a similar routine to map Function 3 to cache lines 2–5 in FIG. 5.

Referring back to FIG. 3 based on the mapping algorithm, the cache would need to flush out code from either Function 1 or Function 2 on cache lines 2 and 3 in order to fetch Function 3. Later, when normal processing resumes, these cache lines will need to be fetched again, as can be seen in FIG. 6 and FIG. 7. FIG. 5–FIG. 7 show the worst case operation of a cache using the LRU replacement algorithm.

With the organization represented in FIG. 4, Function 3 could simply be loaded into the unused set for cache lines 2–5, leaving the important functions untouched. This can be illustrated with reference to FIG. 8. As shown, once normal processing resumes, no additional cache fetches need to be performed.

According to the present invention, the tool is able to calculate cache usage and efficiency without knowledge of anything else that might be running in the system, such as the absolute addresses of functions or modules or knowledge of where code will be fetched in the cache. This allows the tool to run in one pass, using any existing map file for the application. If this were not the case, it would potentially take numerous iterations in order to find a solution.

One-pass optimization is possible because the object files are arranged such that they are adjacent to each other, so that as any unrelated module elsewhere in the system changes location, all of the optimized modules change location or offset by the same amount. The real cache lines being used are irrelevant to the optimization. The only thing that matters is that the cache line mapping is correct and consistent for the offsets of the functions and modules relative to each other.

It is critical for the back-end processing stage to ensure that the relevant modules can be made adjacent, so that the tool can operate on offsets. This also makes the optimization robust against irrelevant code changes. As other modules change in size, they will simply shift the starting address of the optimized modules. Since the optimization relies only on the offsets, not on the absolute addresses, this has no impact on the optimization.

Figure 9:
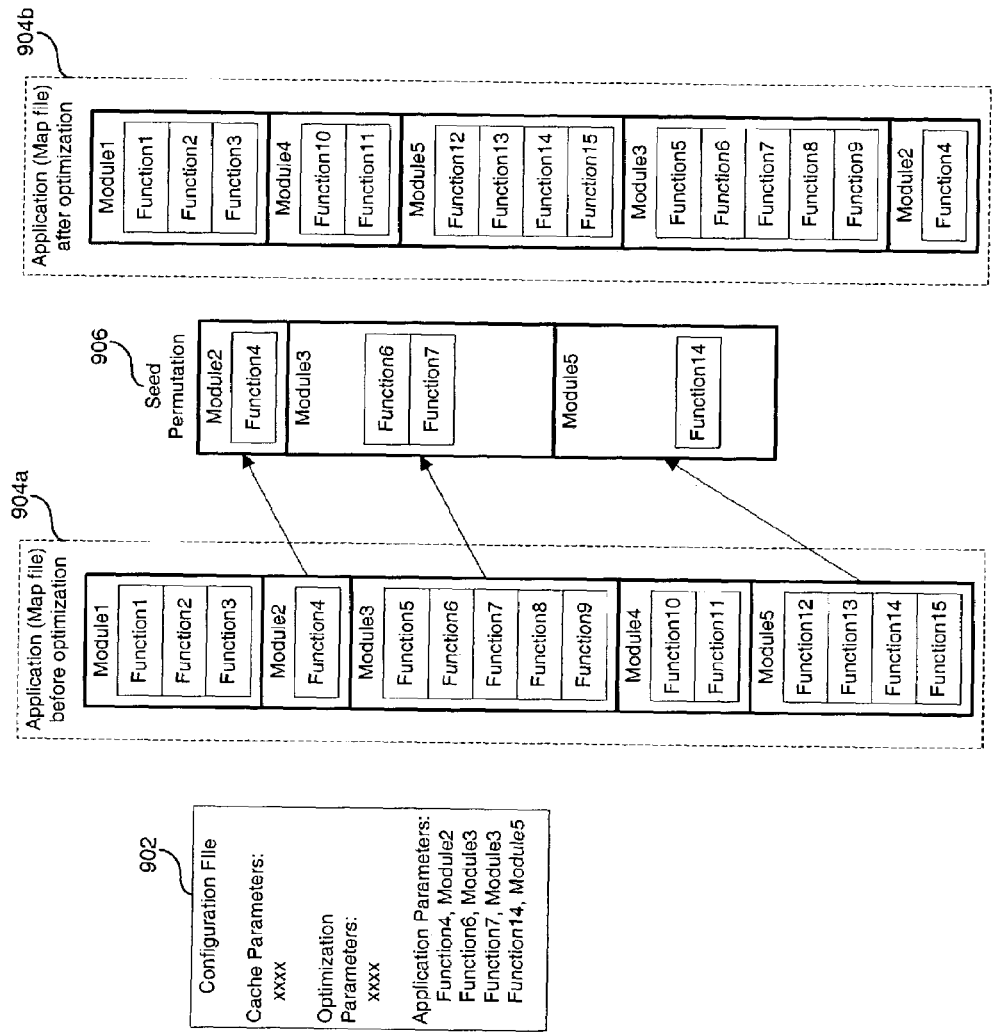
FIG. 9 illustrates an example for analyzing an application and searching for optimum solutions, according to an embodiment of the present invention.

FIG. 9 provides an example of the steps taken by the tool when analyzing the application and searching for solutions that match the optimization parameters, according to an embodiment of the present invention. FIG. 9 shows the startup and final processing stages from steps 101–195 in FIG. 1. The user sets up a configuration file 902 with the parameters needed for the optimization run, and the tool reads this file at startup. The tool then reads a map file 904a for the application, and pulls out the information related to the modules and functions that were specified in configuration file 902. The order of the object files in configuration file 902 becomes a seed value 906 for the permutations.

When the tool starts up, it reads configuration file 902 and map file 904a, and determines whether or not a solution with the specified optimization parameters is possible. In an embodiment, if a solution is not possible with the specified optimization parameters, the tool will display a message informing the user and abort the run, allowing the user to change the parameters or the code.

After the tool finishes running and outputs the desired solution, the user feeds this back to the post processing stage (usually the linker), which creates the final, optimized image (shown as map file 904b) with the module ordering recommended by the tool.

Figure 10:
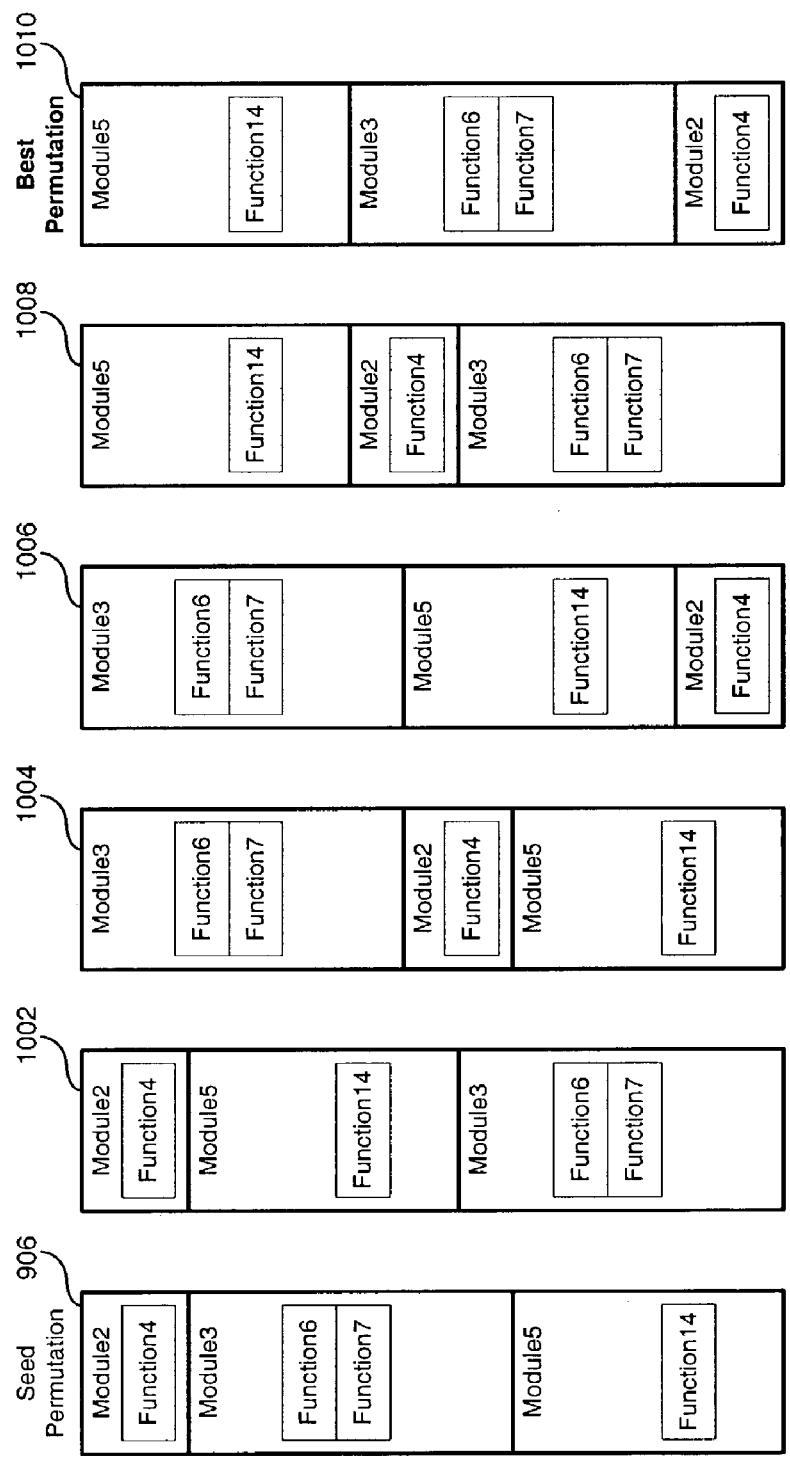
FIG. 10 illustrates an example for iterating through all possible permutations for the optimization example shown in FIG. 9.

FIG. 10 shows the tool iterating through all possible permutations (shown as 906, 1002, 1004, 1006, 1008, and 1010) of the three object modules, starting with seed permutation 906. After calculating each permutation, the tool will set the offset of the first module to an arbitrary base (address 0), and then will calculate the offset of each module that follows based on the size of the modules that come before it.

Once the module offsets have been calculated, the tool will calculate the start and end addresses for the interesting functions contained in the modules. This is used when evaluating the cache efficiency. In FIG. 10, the assumption is that the only permutation satisfying the optimization parameters is the last one (i.e., 1010).

Figure 11:
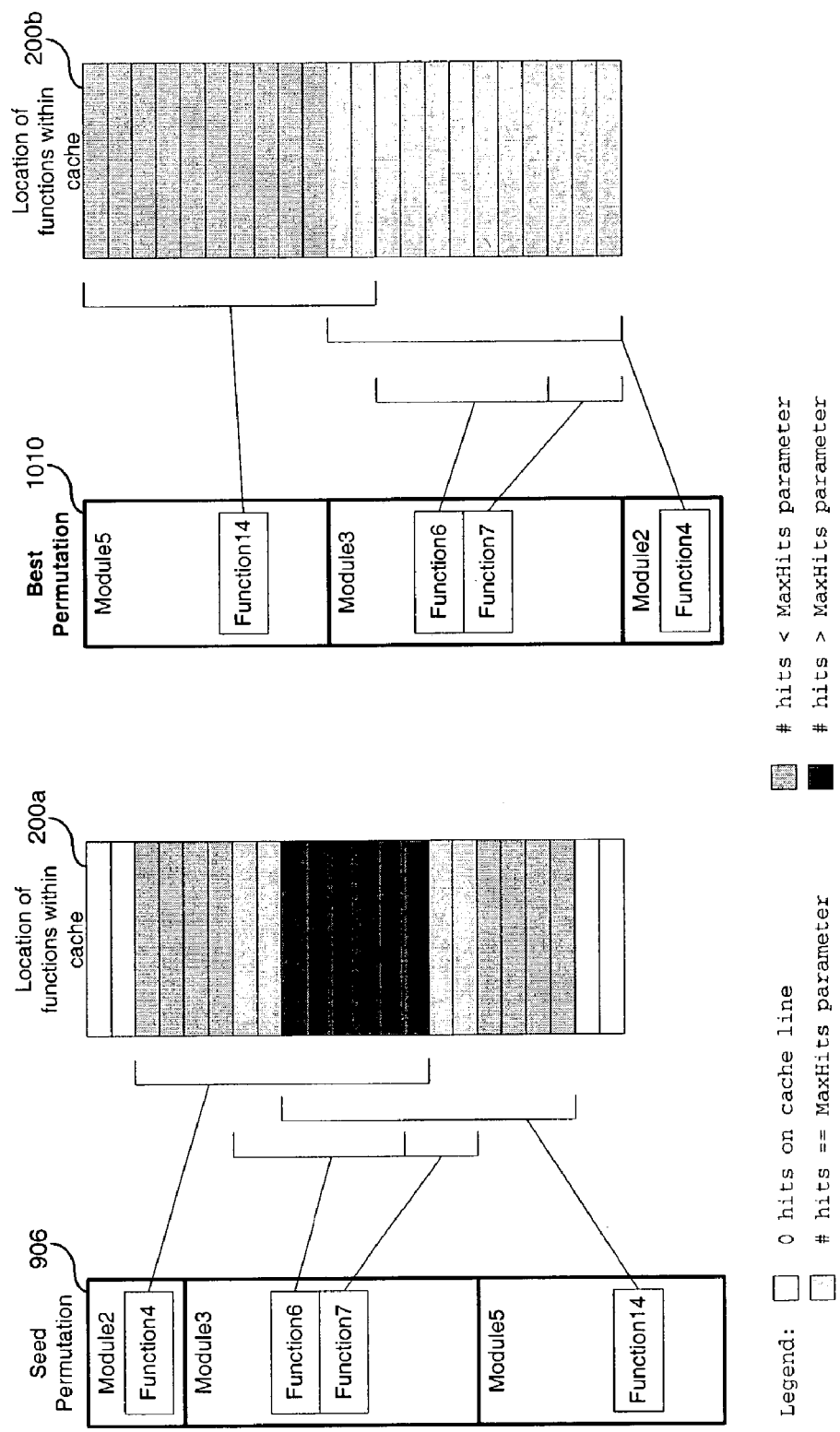
FIG. 11 illustrates an example for evaluating the efficiency of two permutations from the example shown in FIG. 10.

FIG. 11 shows the tool evaluating the efficiency of two permutations (the seed 906 and the best 1010). After calculating the addresses of the functions, the tool iterates over all of the cache lines (in cache 200a and cache 200b) and checks to see which functions 'hit' them, using the cache's algorithm for mapping addresses to cache lines, as described above with reference to FIG. 1. In another embodiment, the tool iterates over all functions to determine which functions hit each cached line, as described with reference to FIG. 13.

Upon determining the number of hits, the tool rejects the solution when the number of hits on a cache line (or the number of cache lines with maximum hits) exceeds the optimization parameters, as shown by seed permutation 906. The best permutation 1010 shows that none of the cache lines have excessive hits, and the number of cache lines with the maximum hits allowed does not exceed the optimization parameters from the configuration file.

According to embodiments of the present invention, the tool can do an acceptable job with the existing source code, requiring no modifications at all. However, the tool can often do a better job with minor changes to the source code. For instance, in order for the tool to analyze a function and optimize it, the function must be present in the map file. In the C/C++ programming languages, it is common to label local helper functions as static, removing them from the global namespace (and map file) so that external modules cannot call them in inappropriate ways. If the static function needs to be optimized, it can be made non-static so that it shows up in the map file, or delineate it with public dummy functions at the beginning and end, and tell the tool to optimize the dummy function at the beginning.

If a public function (i.e., one that is in the global namespace and the map file) is followed by non-public functions (static in C/C++), the tool will not be able to determine where the function ends based on the information in the map file. This makes the function appear to be larger than the actual size, and more cache lines will be reserved for it, effectively wasting them. If the next function is made non-static or a dummy public function is added immediately after it, this will help the tool determine the true function size.

Another option for dealing with static functions is to use the module offset marker in the tool's configuration file. Normally, the tool reads the function information from the map file. The module offset marker provides the information to the tool when it cannot be found in the map file. However, using the module offset marker is error prone, and is not resistant to code changes that make the offsets of functions within the module change. It is better to make the function appear in the map file so that the tool can work with the correct information for the current state of the code.

When there are multiple important functions in the same file, the order of the functions should be changed to be adjacent. Having unimportant functions in between the important ones in the same file leaves small holes that are difficult for the tool to use and optimize, and often these holes are wasted. Making the important functions adjacent ensures that there will not be any holes that cannot be filled.

When using STL in C++, the compiler often generates the code for the template functions at the end of the module and marks them as static so that they do not appear in the global namespace or the map file. Putting a dummy function at the end of the file and telling the tool to optimize it can accommodate these functions. Since the tool does not see the static functions, it thinks they are part of the dummy function and can optimize them.

In large functions, it may be that only part of the function is executed frequently (such as, a loop in the middle, or perhaps just the first twenty instructions). The rest of the function does not need to be accounted for in terms of cache optimization and wastes cache lines. The beginning and end offset markers in the tool's configuration file are used for these kinds of functions so that only the important instructions in the function are optimized.

If the important functions cannot fit completely in cache and cannot be satisfactorily optimized, they could be split into smaller, more manageable "paths" that can be sufficiently optimized. For example, there might be one set of functions that deal with compressing and transmitting video, and another that deal with receiving and decompressing video. Rather than trying to optimize for both paths at the same time, the application parameters can be configured to optimize for the compress/transmit path, then separately optimize for the receive/decompress path and select a solution that works best for both of them (i.e. take the intersection of the two sets of solutions).

For small functions that are called frequently, they can be made inline or converted to macros. This eliminates the function call overhead, and reduces the number of functions that must be optimized.

To improve the optimum solutions for the present invention, the user may consider optimizing and shrinking the important code. The user may also want to reduce inefficiencies, eliminate unnecessary error checking, combine the most common if/else paths, place common code together at the top of the function, and/or move error handling and uncommon code branches to the bottom or to helper functions.

The user may also want to introduce small but irrelevant modules to the optimization. These give the tool more options for adjusting the offsets of other modules and can allow better placement within the cache. A drawback to doing this is that it increases the number of permutations, which can increase the amount of time it takes to find a solution.

As discussed above, the tool uses the list of object modules in the configuration file as the seed value for the first permutation. Choosing a good seed value will dramatically reduce the amount of time it takes to find a good solution. Once a good solution or set of solutions is found, the user may want to reorder the modules in the configuration file so that this solution will be used as the starting point. This will tend to let the tool find related solutions more quickly.

In an embodiment using development tools to support individual function placement, a development tool can be used instead of the front-end analysis tool described above. The present invention is not limited to the use of a front-end analysis tool to find the optimal code placement.

In another embodiment, a linker or some type of post-processing stage can be used to place the important functions such that they are adjacent to each other in cache. Up-front analysis, nonetheless, must be performed to determine which functions are important. As described above with reference to step 106 of FIG. 1, important functions can be identified by using code inspection, logic analysis, profile or debug tools, and the like. However, instead of evaluating multiple permutations of possible orderings to select an optimum solution, a linker or other type of post-processing can be used to optimize the location of the important functions in cache. As discussed above, most linkers unfortunately do not enable a user to place code at the function level of granularity.

FIGS. 1–11 and 13 are conceptual illustrations allowing an explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 12:
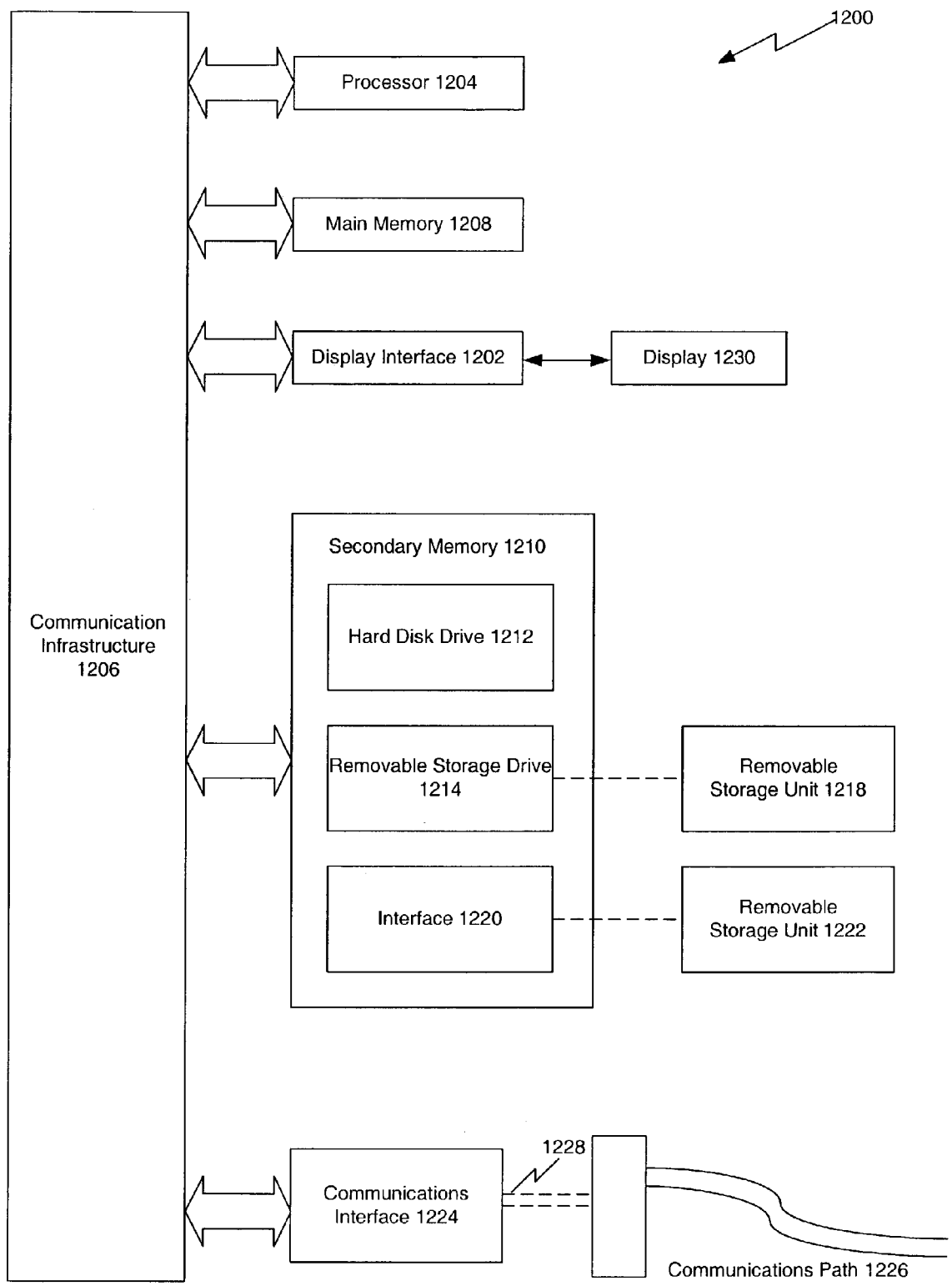
FIG. 12 is an example computer system useful for implementing the present invention.

Additionally, the present invention can be implemented in one or more computer systems or other processing systems, capable of carrying out the functionality described herein. Referring to FIG. 12, an example computer system 1200 useful in implementing the present invention is shown. Various embodiments are described in terms of this exemplary computer system 1200. After reading this description, it will become apparent to a person skilled in the relevant art(s) how to implement the invention using other computer systems and/or computer architectures.

The computer system 1200 includes one or more processors, such as processor 1204. Processor 1204 can be a special purpose or a general purpose digital signal processor. The processor 1204 is connected to a communication infrastructure 1206 (e.g., a communications bus, cross-over bar, or network).

Computer system 1200 can include a display interface 1202 that forwards graphics, text, and other data from the communication infrastructure 1206 (or from a frame buffer not shown) for display on the display unit 1230.

Computer system 1200 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well-known manner. Removable storage unit 1218, represents a floppy disk, magnetic tape, optical disk, etc. which is read by and written to removable storage drive 1214. As will be appreciated, the removable storage unit 1218 includes a computer usable storage medium having stored therein computer software (e.g., programs or other instructions) and/or data.

In alternative embodiments, secondary memory 1210 includes other similar means for allowing computer programs or other instructions to be loaded into computer system 1200. Such means include, for example, a removable storage unit 1222 and an interface 1220. Examples of such means include a program cartridge and cartridge interface (such as that found in video game devices), a removable memory chip (such as, an EPROM or PROM) and associated socket, and other removable storage units 1222 and interfaces 1220 which allow software and data to be transferred from the removable storage unit 1222 to computer system 1200.

Computer system 1200 can also include a communications interface 1224. Communications interface 1224 allows software and/or data to be transferred between computer system 1200 and external devices. Examples of communications interface 1224 include a modem, a network interface (such as an Ethernet card), a communications port, a PCM-CIA slot and card, etc. Software and data transferred via communications interface 1224 are in the form of signals 1228 which can be electronic, electromagnetic, optical or other signals capable of being received by communications interface 1224. These signals 1228 are provided to communications interface 1224 via a communications path (i.e., channel) 1226. Communications path 1226 carries signals 1228 and can be implemented using wire or cable, fiber optics, a phone line, a cellular phone link, an RF link, free-space optics, and other communications channels.

In this document, the terms "computer program medium" and "computer usable medium" are used to generally refer to media such as removable storage unit 1218, removable storage unit 1222, a hard disk installed in hard disk drive 1212, and signals 1228. These computer program products are means for providing software to computer system 1200. The invention, in an embodiment, is directed to such computer program products.

Computer programs (also called computer control logic or computer readable program code) are stored in main memory 1208 and/or secondary memory 1210. Computer programs can also be received via communications interface 1224. Such computer programs, when executed, enable the computer system 1200 to implement the present invention as discussed herein. In particular, the computer programs, when executed, enable the processor 1204 to implement the processes of the present invention, such as the one or more steps of method 100 described above. Accordingly, such computer programs can perform functions of the front-end analysis program (tool) described above.

In an embodiment where the invention is implemented using software, the software can be stored in a computer program product and loaded into computer system 1200 using removable storage drive 1214, hard drive 1212 or communications interface 1224. The control logic (software), when executed by the processor 1204, causes the processor 1204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method for optimizing cache efficiency, comprising the steps of:

receiving an application that includes a plurality of functions, said functions including compiled code, which are executed by a processor;

locating each function;

ordering said functions for placement in a cache memory comprising cache sets, wherein said ordering is repeated until reaching a specified stopping point, wherein each permutation of said ordering produces a unique ordered sequence;

evaluating the efficiency of each permutation of said ordering; and selecting a permutation in which the code is stored in the smallest number of cache sets to thereby optimize use of said cache memory.

2. The method of claim 1, wherein said locating step comprises the step of:

determining at least one of a start address and an ending address for each function.

3. The method of claim 2, wherein said locating step further comprises the step of:

converting said at least one of a start address and an ending address to an offset.

4. The method of claim 3, further comprising the step of:

updating the offsets for each function after each permutation.

5. The method of claim 4, wherein said updating step comprises the step of:

setting the offset of the first function to an arbitrary base; and calculating the offset of each following function based on the size of the preceding function.

6. The method of claim 4, wherein said updating step comprises the step of:

iterating over all functions to set said at least one of a start address and an ending address.

7. The method of claim 1, further comprising the step of:

accessing a configuration file to receive said plurality of functions, wherein the order of functions within said configuration file is the seed value for each permutation of said ordering.

8. The method of claim 1, wherein said evaluating step comprises the step of:

determining a number of hits per cache line within said cache memory.

9. The method of claim 8, wherein said determining step comprises the step of:

iterating over each cache line within said cache memory to determine which functions hit said cache line.

10. The method of claim 8, wherein said determining step comprises the step of:
    iterating over each function to determine which functions hit each cache line within said cache memory, said iterating being executed once per function.

11. The method of claim 8, further comprising the step of:
    rejecting a permutation if a number of hits on a cache line exceeds a predetermined quantity.

12. The method of claim 8, further comprising the step of:
    rejecting a permutation if no cache line has a number of hits that exceed a predetermined quantity and a total number of cache lines having a number of hits equal to said predetermined quantity exceeds a predetermined threshold.

13. The method of claim 1, wherein said selecting step further comprises the step of:
    selecting a permutation having important functions placed in said smallest number of sets and leaving the empty sets available for subsequent placement of other functions.

14. A computer-implemented method for optimizing cache efficiency, comprising the steps of:
    receiving an application that includes a plurality of object modules, each object module comprising one or more functions, said one or more functions including compiled code, which are executed by a processor;
    ordering said object modules for placing said one or more functions in a cache memory comprising cache sets, wherein said ordering is repeated until reaching a specified stopping point, wherein each permutation of said ordering produces a unique ordered sequence;
    evaluating the efficiency of each permutation of said ordering; and
    selecting a permutation in which the code is stored in the smallest number of cache sets to thereby to optimize said cache memory.

15. The method of claim 14, wherein said ordering step comprises:
    ordering said object modules for placing said functions relative to an arbitrary base address based on offset values.

16. A computer-implemented method for optimizing cache efficiency, comprising the steps of:
    accessing a plurality of information sets;
    producing a plurality of arrangements for placing said information sets in a cache memory comprising cache sets, wherein said producing comprises accessing a threshold parameter to specify a quantity of said arrangements; and
    evaluating the efficiency of said arrangements to detect an optimum arrangement in which the information sets are stored in the smallest number of cache sets.

17. The method of claim 16, wherein said accessing step comprises:
    accessing a plurality of information sets comprising compiled code for an application program.

18. The method of claim 17, further comprising the step of:
    identifying important functions from said compiled code, wherein said producing step is executed to only produce arrangements for placing said important functions in said cache memory.

19. The method of claim 18, wherein said identifying step comprises:
    inspecting said compiled code to identify said important functions.

20. The method of claim 18, wherein said identifying step comprises:
    analyzing said compiled code with a logic analyzer to identify said important functions.

21. The method of claim 18, wherein said identifying step comprises:
    analyzing said compiled code with a profile or debug tool to identify said important functions.

22. The method of claim 16, wherein said producing step comprises:
    producing a plurality of arrangements for placing said information sets in a data cache.

23. A computer-implemented method for optimizing cache efficiency, comprising the steps of:
    producing a plurality of arrangements for placing a plurality of functions in a cache memory comprising cache sets, said functions comprising code for an application program, wherein said producing comprises accessing a threshold parameter to specify a quantity of said arrangements;
    analyzing one of said arrangements to determine the quantity of said functions within said arrangement that hits each cache line of said cache memory; and
    selecting said arrangement as an optimum arrangement in which the code is stored in the smallest number of cache sets.

24. A computer-implemented method for optimizing cache efficiency, comprising the steps of:
    producing a plurality of arrangements for placing a plurality of functions in a cache memory, said functions comprising code for an application program;
    analyzing one of said arrangements to determine the quantity of said functions within said arrangement that hits each cache line of said cache memory; and
    selecting said arrangement as an optimum arrangement in response to determining the quantity of hits for each cache line from said analyzing step does not exceed a specified first parameter, and in response to determining the total cache lines having hits from said analyzing step equal to said specified first parameter do not exceed a specified second parameter.

25. A computer-implemented method for optimizing cache efficiency, comprising the steps of:
    producing a plurality of arrangements for placing a plurality of functions in a cache memory, said functions comprising code for an application program;
    analyzing one of said arrangements to determine the quantity of said functions within said arrangement that hits each cache line of said cache memory; and
    selecting said arrangement as an optimum arrangement in response to determining the quantity of hits for each cache line from said analyzing step wherein said arrangement does not exceed a specified first parameter, and in response to determining the total cache lines having hits from said analyzing step exceeding the cache set associativity, wherein the total cache lines having hits from said analyzing step exceeding the cache set associativity do not exceed a specified second parameter.

26. A computer-implemented method for optimizing cache efficiency, comprising the steps of:
    producing a plurality of arrangements for placing a plurality of information sets in a cache memory comprising cache sets;

analyzing said arrangements to select an optimum arrangement in response to determining said optimum arrangement complies with a specified optimization parameter; and enabling modifications to said specified optimization parameter to produce a second value for said specified optimization parameter in response to determining that no arrangement complies with the first value of said specified optimization parameter, wherein said analyzing step is executed with said second value and in which the information sets are stored in the smallest number of cache sets.

27. A computer-implemented method for optimizing cache efficiency, comprising the steps of:

accessing a plurality of functions, said functions comprising code for an application program;

identifying important functions from said plurality of functions;

producing a plurality of arrangements for placing the important functions in cache memory comprising cache sets; and analyzing said arrangements to select an optimum arrangement in which the code for the important functions is stored in the smallest number of cache sets.

28. A computer-implemented method for optimizing cache efficiency, comprising the steps of:

producing a plurality of arrangements for placing a plurality of information sets in a cache memory comprising cache sets;

analyzing said arrangements to select an optimum arrangement in response to determining said optimum arrangement complies with a specified optimization parameter; and enabling modifications to said specified optimization parameter to produce a second value for said specified optimization parameter in response to identifying an arrangement having attributes complying with said specified optimization parameter, said second value matching said attributes, wherein said analyzing step is executed with said second value and in which the information sets are stored in the smallest number of cache sets.

29. A computer-implemented method for optimizing cache efficiency, comprising the steps of:

receiving an application that includes a plurality of functions, said functions including compiled code, which are executed by a processor;

locating each function;

ordering said functions for placement in a cache memory, wherein said ordering is repeated until reaching a specified stopping point, wherein each permutation of said ordering produces a unique ordered sequence;

determining a number of hits per cache line within said cache memory;

evaluating the efficiency of each permutation of said ordering; and selecting a permutation that does not violate a specified optimization parameter and in which the code completely fills the smallest number of sets across all cache lines to thereby optimize use of said cache memory.

30. The method of claim 29, wherein said determining step comprises the step of:

iterating over each cache line within said cache memory to determine which functions hit said cache line.

31. The method of claim 29, wherein said determining step comprises the step of:

iterating over each function to determine which functions hit each cache line within said cache memory, said iterating being executed once per function.

32. The method of claim 29, further comprising the step of:

rejecting a permutation if a number of hits on a cache line exceeds a predetermined quantity.

33. The method of claim 29, further comprising the step of:

rejecting a permutation if no cache line has a number of hits that exceed a predetermined quantity and a total number of cache lines having a number of hits equal to said predetermined quantity exceeds a predetermined threshold.

34. The method of claim 24, wherein the cache memory comprises cache sets and wherein the code is stored in the smallest number of cache sets.

35. The method of claim 25, wherein the cache memory comprises cache sets and wherein the functions are stored in the smallest number of cache sets.

* * * * *